United States Patent
Workman et al.

(10) Patent No.: US 9,515,500 B2
(45) Date of Patent: Dec. 6, 2016

(54) PORTABLE ENERGY STORAGE AND POWER SUPPLY SYSTEM

(71) Applicant: Goal Zero LLC, Bluffdale, UT (US)

(72) Inventors: Robert E. Workman, Morgan, UT (US); Norman Krantz, Draper, UT (US); Fred Lillywhite, Cottonwood Heights, UT (US); Keyvan Vasefi, Payson, UT (US); Walker Ford, Holladay, UT (US); Sterling Robison, Cottonwood Heights, UT (US); Henry J. Howell, Herriman, UT (US); Jaremy Butler, Herriman, UT (US)

(73) Assignee: GOAL ZERO LLC, Bluffdale, UT (US)

( * ) Notice: Subject to any disclaimer, the term of this patent is extended or adjusted under 35 U.S.C. 154(b) by 237 days.

(21) Appl. No.: 14/326,258

(22) Filed: Jul. 8, 2014

(65) Prior Publication Data

US 2016/0013673 A1    Jan. 14, 2016

(51) Int. Cl.
*H02J 7/00*    (2006.01)

(52) U.S. Cl.
CPC .................................. *H02J 7/0044* (2013.01)

(58) Field of Classification Search
CPC ... H02J 7/0044; H02J 7/0054; H01R 13/5202; H01R 13/5205; H01R 13/5208; H01R 13/521; H01R 13/5219; H01R 13/5221; H01M 2/10; H01M 10/04
USPC .................................................. 320/114–115
See application file for complete search history.

(56) References Cited

U.S. PATENT DOCUMENTS

| | | | |
|---|---|---|---|
| 4,828,513 A | 5/1989 | Morrison et al. |
| 6,534,709 B2 | 3/2003 | English |
| D629,746 S | 12/2010 | Workman et al. |
| 8,080,972 B2 | 12/2011 | Smith |
| D651,564 S | 1/2012 | Workman et al. |
| D664,499 S | 7/2012 | Workman et al. |
| D670,244 S | 11/2012 | Workman et al. |
| D695,680 S | 12/2013 | Workman et al. |
| 2006/0274493 A1 | 12/2006 | Richardson et al. |
| 2009/0109283 A1 | 4/2009 | Scott et al. |

(Continued)

FOREIGN PATENT DOCUMENTS

| JP | 2011-087392 A | 4/2011 |
|---|---|---|
| WO | WO-2011/106431 | 9/2011 |

OTHER PUBLICATIONS

International Search Report on PCT Application No. PCT/US2015/039398 (F&L 097296-0196), mail date Oct. 12, 2015, 6 pages.

(Continued)

*Primary Examiner* — Richard Isla Rodas
*Assistant Examiner* — David V Henze-Gongola
(74) *Attorney, Agent, or Firm* — Foley & Lardner LLP

(57) ABSTRACT

A portable energy storage and power supply system includes a first housing member coupled to a second housing member, the first housing member and the second housing member defining an internal space, a battery disposed within the internal space and configured to store electrical power, a plurality of connectors defining an input for charging the battery and an output for utilizing electrical power from the battery, and a gasket. The gasket includes a base portion coupling the first housing member with the second housing member and a bumper shaped to absorb shock loading.

9 Claims, 8 Drawing Sheets

(56) References Cited

U.S. PATENT DOCUMENTS

| | | |
|---|---|---|
| 2010/0006468 A1 | 1/2010 | Lin |
| 2011/0170249 A1 | 7/2011 | Nunes |
| 2012/0025766 A1 | 2/2012 | Reade et al. |
| 2012/0262109 A1 | 10/2012 | Toya et al. |
| 2012/0281392 A1 | 11/2012 | Workman et al. |
| 2013/0043826 A1 | 2/2013 | Workman et al. |
| 2013/0181661 A1 | 7/2013 | Workman et al. |
| 2013/0183562 A1 | 7/2013 | Workman et al. |
| 2013/0203277 A1* | 8/2013 | Gaubert ............. H01R 13/6277 439/271 |
| 2014/0195826 A1* | 7/2014 | Wojcik ................ H05K 5/0086 713/300 |
| 2014/0239717 A1 | 8/2014 | Prommel et al. |
| 2015/0217653 A1* | 8/2015 | Ogawa ................ B60L 11/1809 320/109 |
| 2015/0263553 A1* | 9/2015 | Fuller .................. H02J 7/0044 320/114 |

OTHER PUBLICATIONS

Written Opinion of International PCT Application No. PCT/US2015/039398 (F&L 097296-0196), mail date Oct. 12, 2015, 6 pages.
U.S. Appl. No. 29/498,046, filed Jul. 30, 2014, Krantz et al.
U.S. Appl. No. 62/022,631, filed Jul. 9, 2014, Workman et al.

* cited by examiner

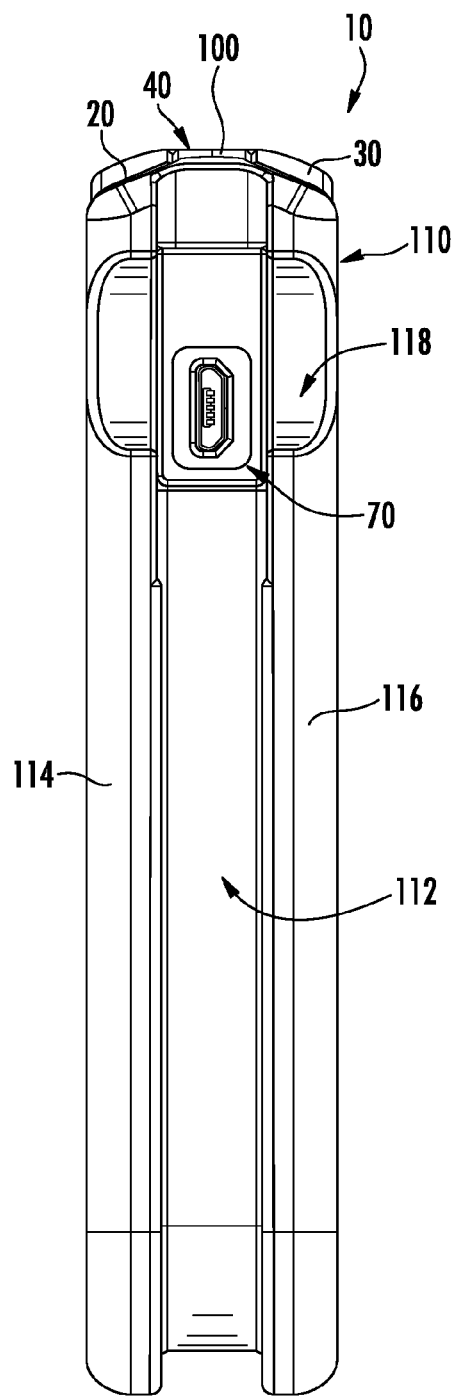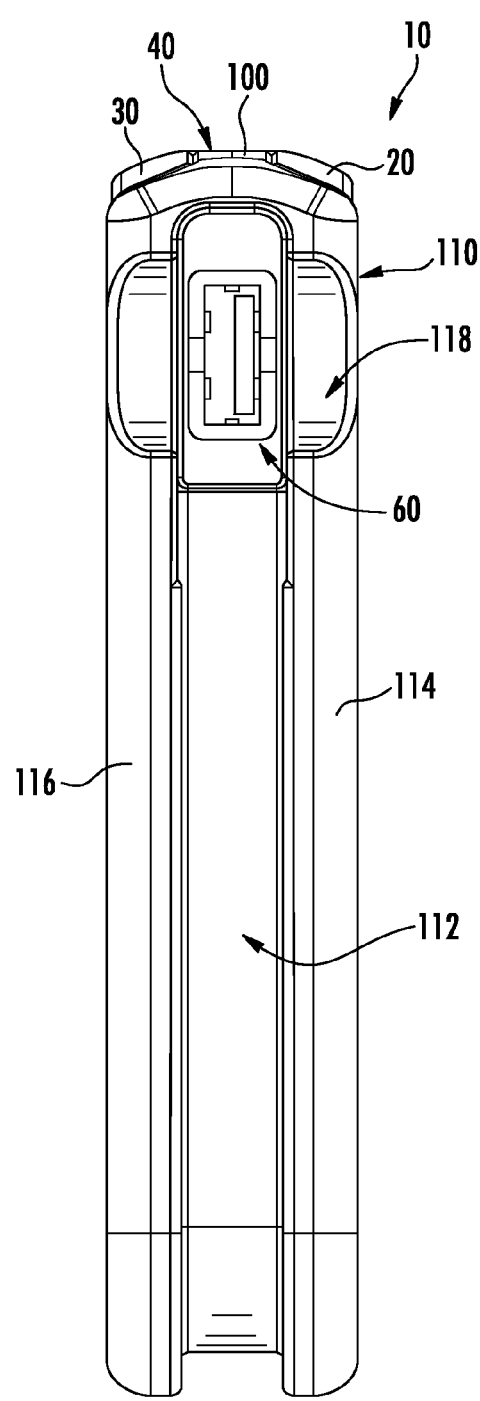

PORTABLE ENERGY STORAGE AND POWER SUPPLY SYSTEM

BACKGROUND

The present disclosure relates to portable power supply devices. In particular, the present disclosure relates to portable power supply devices that may be charged to store electrical energy and discharged to power external electronic devices.

Energy storage devices often include one or more batteries that may be charged to store electrical energy. Such energy storage devices may be used to extend the battery life of various electronic components (e.g., a cellular telephone, a camera, etc.) when access to traditional power sources is limited. A connector may be used to couple the energy storage device with a source of electrical power (e.g., a wall outlet, etc.). A user may couple the energy storage device to an electronic device to either power the electronic device or charge a battery of the electronic device. Cases house the circuitry and batteries, among other internal components, of traditional energy storage devices. Such internal components may be damaged when a user accidentally drops or otherwise mishandles the energy storage device, potentially leaving the user without a source of energy.

SUMMARY

One embodiment of the disclosure relates to a portable energy storage and power supply system that includes a first housing member coupled to a second housing member, the first housing member and the second housing member defining an internal space, a battery disposed within the internal space and configured to store electrical power, a plurality of connectors defining an input for charging the battery and an output for utilizing electrical power from the battery, and a gasket. The gasket includes a base portion coupling the first housing member with the second housing member and a bumper shaped to absorb shock loading.

Another embodiment of the disclosure relates to a portable energy storage and power supply system that includes a first housing member coupled to a second housing member, the first housing member and the second housing member defining an internal space, a gasket including a base portion coupling the first housing member with the second housing member, a battery disposed within the internal space and configured to store electrical power, and a connector assembly coupled to the battery. The connector assembly includes a shield having an open end and a closed end and a grommet disposed around an outer surface of the shield. The grommet is configured to reduce moisture penetration into the internal space of the first housing member and the second housing member.

Still another embodiment of the disclosure relates to a method of sealing a port that includes providing a connector, the connector including a shield that defines a plurality of apertures, disposing a grommet around an outer surface of the shield and over the plurality of apertures, providing a housing including a periphery that defines an opening, and inserting the grommet and the connector into the opening.

The invention is capable of other embodiments and of being carried out in various ways. Alternative exemplary embodiments relate to other features and combinations of features as may be recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 4 is a right side view of the portable energy storage and power supply system shown in FIG. 1, according to an exemplary embodiment;

FIG. 5 is a left side view of the portable energy storage and power supply system shown in FIG. 1, according to an exemplary embodiment;

DETAILED DESCRIPTION

According to an exemplary embodiment, a portable energy storage and power supply system includes a battery disposed within an internal space of a case. An operator may utilize the portable energy storage and power supply system to charge or otherwise power electronic devices (e.g., cellular telephones, portable music players, cameras, tablets, laptop computers, global positioning systems, etc.). The portable energy storage and power supply system may be charged using various sources including, among others, solar panels, a generator, a wall outlet, and a computer. The case of the portable energy storage and power supply system includes a pair of housing members, and a gasket is positioned to reduce the risk of moisture penetration into the internal space of the case. In one embodiment, a surface of the gasket at least partially defines the internal space. The gasket substantially seals the internal space of the case while also absorbing shock loading, according to an exemplary embodiment. The portable energy storage and power supply system may include one or more connector assemblies that include grommets configured to reduce moisture penetration into the internal space defined by the case and the gasket.

Figure 6:
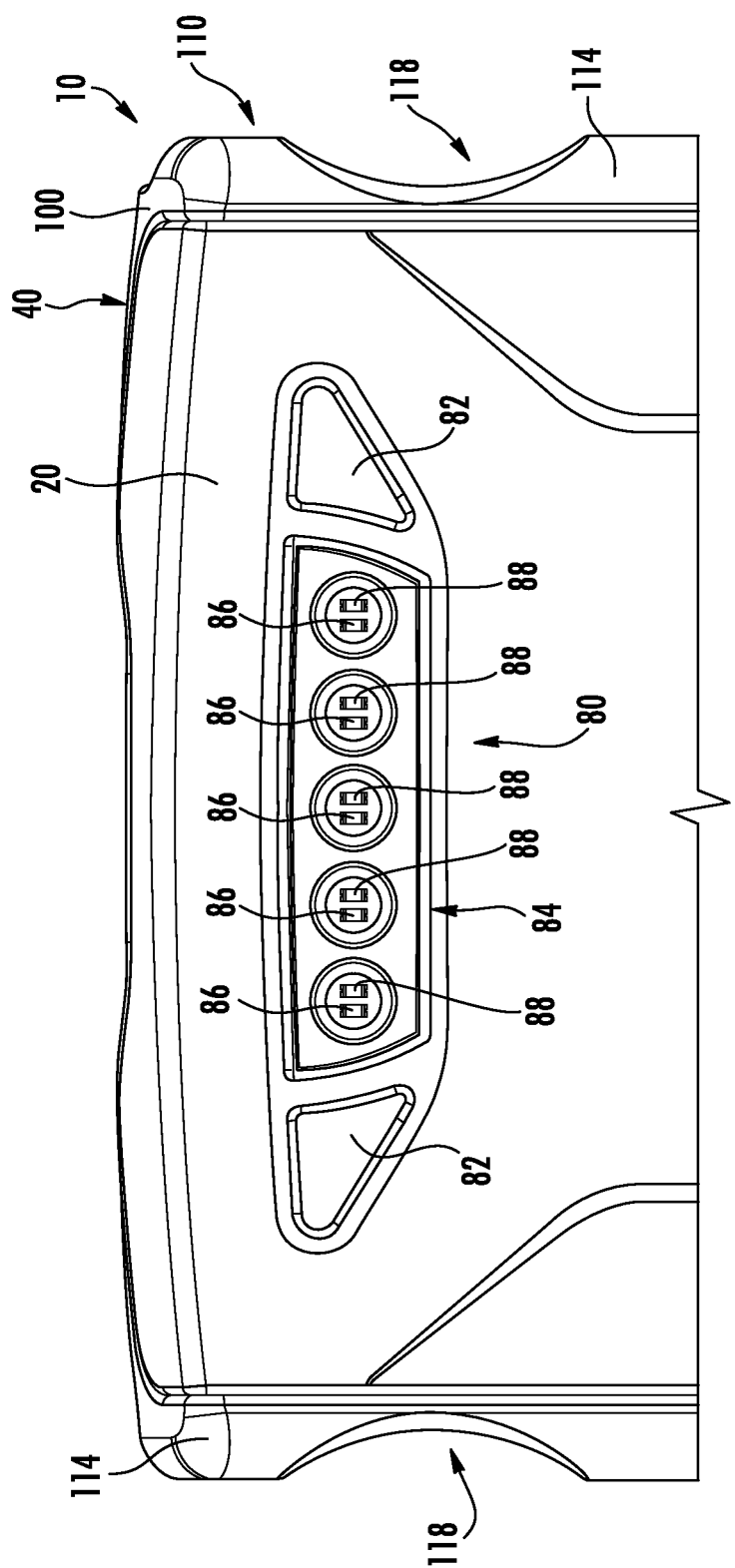
FIG. 6 is a detail front plan view of the portable energy storage and power supply system shown in FIG. 1, according to an exemplary embodiment.
Figure 7:
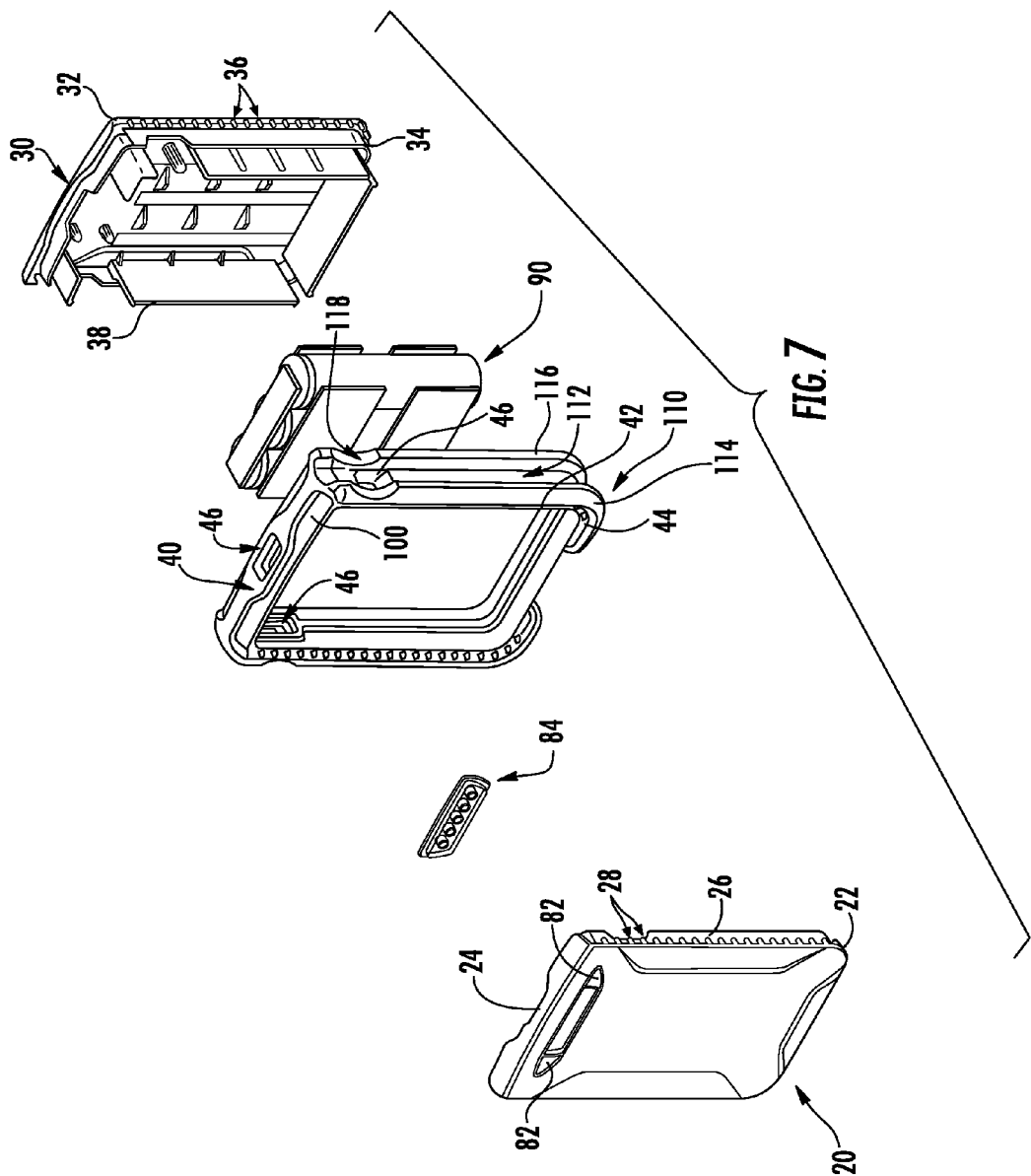
FIG. 7 is an exploded view of the portable energy storage and power supply system shown in FIG. 1, according to an exemplary embodiment.

Referring to the exemplary embodiment shown in FIGS. 1-7, a portable energy storage and power supply system, shown as power pack 10, includes a case that includes a first housing member 20 and a second housing member 30. A gasket, shown as gasket 40, is disposed between at least a portion of first housing member 20 and second housing member 30. A first connector assembly 50, a second connector assembly 60, and a third connector assembly 70 are coupled to at least one of first housing member 20, second housing member 30, and gasket 40, according to an exemplary embodiment. Power pack 10 includes a user interface, shown as user interface 80, that is coupled to first housing member 20. As shown in FIG. 7, first housing member 20 and second housing member 30 define an internal space configured to contain a battery, shown as battery 90. Gasket 40 may substantially seal the internal space defined by first housing member 20 and second housing member 30. In one embodiment a surface of gasket 40 (e.g., an inner surface, etc.) defines at least a portion of the internal space.

As shown in FIG. 7, first housing member 20 includes a first plate, shown as faceplate 22, that defines an aperture, shown as opening 24. A plurality of flanges, shown as flanges 26, are coupled to faceplate 22. Flanges 26 may extend from faceplate 22 toward second housing member 30. Flanges 26 may be separate components coupled to faceplate 22, or flanges 26 may be integrally formed with faceplate 22, according to various alternative embodiments. In one embodiment, flanges 26 are configured to engage corresponding portions of gasket 40 to create a waterproof seal. As shown in FIG. 7, gasket 40 defines an aperture, shown as slot 42, that is configured to engage flanges 26 to create the waterproof seal. Flanges 26 may have various shapes and lengths intended to reduce the risk of moisture penetration into the internal space of power pack 10. In one embodiment, slot 42 has a shape that corresponds to (e.g., mates with, is a negative of when viewed in a plane that sections first housing member 20 and gasket 40, etc.) the shape of flange 26 such that flanges 26 interlock slots 42 to form a waterproof seal.

According to the exemplary embodiment shown in FIG. 7, first housing member 20 includes a plurality of protrusions, shown as bosses 28, that are configured to engage a plurality of apertures, shown as depressions 44, defined by gasket 40. Bosses 28 may extend from faceplate 22 toward second housing member 30. Bosses 28 may be separate components coupled to faceplate 22, or bosses 28 may be integrally formed with faceplate 22, according to various alternative embodiments. In one embodiment, the engagement of bosses 28 with depressions 44 further secures at least one of first housing member 20 and gasket 40 (e.g., to further prevent moisture penetration, to reduce the risk that a portion of gasket 40 may pull away from first housing member 20 during use or transportation of power pack 10, etc.).

Referring again to FIG. 7, second housing member 30 includes a second plate, shown as backing plate 32. A plurality of flanges, shown as flanges 34, are coupled to backing plate 32. Flanges 34 may extend from backing plate 32 toward faceplate 22. Flanges 34 may be separate components coupled to backing plate 32, or flanges 34 may be integrally formed with backing plate 32, according to various alternative embodiments. In one embodiment, flanges 34 are configured to engage corresponding portions (e.g., slots, etc.) of gasket 40 to create a waterproof seal. Flanges 34 may have various shapes and lengths intended to reduce the risk of moisture penetration into the internal space of power pack 10. In one embodiment, a portion of gasket 40 has a shape that corresponds to (e.g., mates with, is a negative image viewed in a plane that sections second housing member 30 and gasket 40, etc.) the shape of flange 34 such that flanges 34 interlock gasket 40 to form a waterproof seal.

As shown in FIG. 7, second housing member 30 includes a plurality of protrusions, shown as bosses 36, that are configured to engage a plurality of apertures defined by gasket 40. Bosses 36 may extend from backing plate 32 toward faceplate 22. Bosses 36 may be separate components coupled to backing plate 32, or bosses 36 may be integrally formed with backing plate 32, according to various alternative embodiments. In one embodiment, the engagement of bosses 36 with gasket 40 further secures at least one of second housing member 30 and gasket 40 (e.g., to further prevent moisture penetration, to reduce the risk that a portion of gasket 40 may pull away from second housing member 30 during use or transportation of power pack 10, etc.).

Referring still to FIG. 7, second housing member 30 includes a plurality of protrusions, shown as tabs 38, extending from backing plate 32. Tabs 38 may retain battery 90 or another component of power pack 10, according to an exemplary embodiment. Tabs 38 are configured to extend through gasket 40 and engage first housing member 20, according to an exemplary embodiment. In one embodiment, an inner surface of gasket 40 engages outer surfaces of tabs 38. Gasket 40 may thereby extend over (e.g., substantially seal, enclose, etc.) the various openings between tabs 38 to reduce the risk of moisture penetration into the internal space of power pack 10. In one embodiment, tabs 38 include proximal ends that are coupled to backing plate 32 and distal ends configured to engage a portion of first housing member 20 (e.g., an inner surface of faceplate 22, etc.). By way of example, tabs 38 may be coupled to or integrally formed with backing plate 32. Tabs 38 may be adhesively secured, coupled with a snap fit connection, coupled with a press fit connection, coupled with fasteners, or otherwise secured to first housing member 20. According to an alternative embodiment, tabs 38 extend from faceplate 22 and include distal ends that are coupled to backing plate 32.

According to the exemplary embodiment shown in FIGS. 1-7, gasket 40 includes a plurality of apertures, shown as openings 46, that receive first connector assembly 50, second connector assembly 60, and third connector assembly 70. In one embodiment, a periphery of gasket 40 defines each of the openings 46.

As shown in FIGS. 1-7, gasket 40 includes a base portion 100 and a bumper (e.g., cushion, pad, etc.), shown as bumper 110. Base portion 100 extends between a surface of first housing member 20 and a surface of second housing member 30, according to an exemplary embodiment. In one embodiment, base portion 100 is integrally formed with bumper 110 and defines a single unitary body. In other embodiments, base portion 100 is adhesively secured, interlocked, or otherwise coupled to bumper 110. According to an exemplary embodiment, base portion 100 couples first housing member 20 with second housing member 30 and forms a waterproof seal configured to reduce the risk of moisture penetration into power pack 10. By way of example, base portion 100 may reduce the risk that rain or splashes of water will damage battery 90 or internal circuitry of power pack 10. By way of another example, base portion 100 may reduce the risk of damage to battery 90 or internal circuitry of power pack 10 upon at least partial submersion (e.g., when power pack 10 is accidentally dropped into a puddle or other pool of water, when power pack 10 is submerged into a volume of water, etc.).

Bumper 110 is shaped to absorb shock loading that may otherwise damage power pack 10, according to an exemplary embodiment. In one embodiment, at least one of first housing member 20 and second housing member 30 defines an outer edge (e.g., an outer periphery), and bumper 110 extends further outward relative to the outer edge. By way of example, at least one of first housing member 20 and second housing member 30 may define a central axis, and bumper 110 may extend further outward than an outer edge of first housing member 20 and second housing member 30 relative to the central axis.

An operator may accidentally drop power pack 10 onto a hard surface (e.g., a concrete pathway, a rock, etc.), and the sudden impact may impart a shock load to power pack 10. Such shock loading may travel into first housing member 20, second housing member 30, user interface 80, battery 90, sensitive electronic components (e.g., processing circuits, memory, etc.), or still other components of power pack 10. According to an exemplary embodiment, bumper 110 at least partially absorbs such shock loading to reduce the risk of damage to at least one of first housing member 20, second housing member 30, user interface 80, battery 90, and the sensitive electronic components (e.g., processing circuits, memory, etc.) of power pack 10.

According to an exemplary embodiment, bumper 110 is formed from a resilient, flexible material. By way of example, bumper 110 may be formed from silicone, urethane, or rubber, among other materials. According to an exemplary embodiment, bumper 110 forms a solid structure (e.g., extends continuously between an outer surface and base portion 100, etc.). According to an alternative embodiment, bumper 110 defines an inner pocket (e.g., an inner pocket that is sealed from a surrounding environment and filed with air or another gas, an inner pocket that is open to a surrounding environment, etc.). The shock loading may deform bumper 110. Such deformation may dissipate at least a portion of an impact energy associated with the shock loading, thereby reducing the shock loading and impact energy that is transmitted to the other components of power pack 10. After the shock loading occurs, bumper 110 may spring back into its original position and shape such that it may absorb additional impacts.

According to an alternative embodiment, bumper 110 is formed from a material configured to crush or otherwise permanently deform upon impact (e.g., a honeycomb, etc.). Bumper 110 formed from a crushable material may dissipate a higher level of impact energy than a bumper 110 formed from a resilient material. In one embodiment, the deformation of the crushable material dissipates the impact energy associated with the shock loading. Bumper 110 formed from the crushable material may remain in a crushed configuration after the impact. After the impact, an operator may replace bumper 110 to again protect power pack 10.

Figure 1:
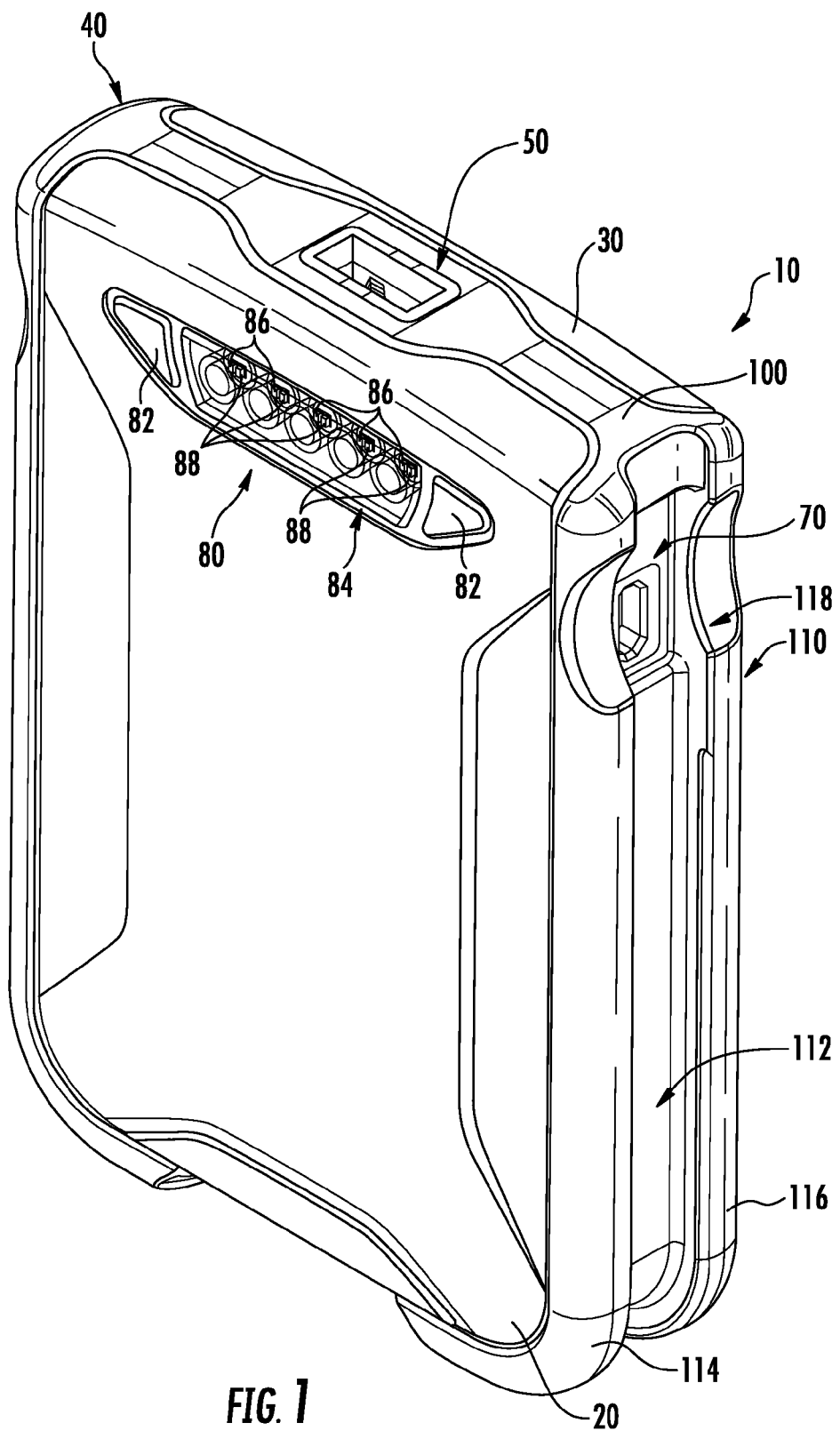
FIG. 1 is a front perspective view of a portable energy storage and power supply system, according to an exemplary embodiment.

As shown in FIG. 1, bumper 110 defines an aperture, shown as channel 112. Channel 112 is configured to receive a power cable of power pack 10, according to an exemplary embodiment. As shown in FIG. 1, bumper 110 includes a first projection, shown as ridge 114, and a second projection, shown as ridge 116 positioned to protect faceplate 22 and backing plate 32, respectively. In one embodiment, ridge 114 and ridge 116 each define a portion (e.g., a sidewall, etc.) of channel 112. Ridge 114 is positioned on a first side of channel 112 (e.g., a front side, etc.), and ridge 116 is positioned on an opposing second side of channel 112 (e.g., a back side, etc.), according to an exemplary embodiment. Bumper 110 having ridge 114 and ridge 116 may deform and dissipate an increased amount of impact energy relative to a bumper having a solid shape that extend across the thickness of power pack 10. In one embodiment, ridge 114 and ridge 116 extend entirely around a periphery of power pack 10 (e.g., a periphery of first housing member 20, a periphery of second housing member 30, etc.). According to the alternative embodiment shown in FIGS. 1-7, ridge 114 and ridge 116 extend partially around the periphery of power pack 10. As shown in FIGS. 1-7, ridge 114 and ridge 116 extend longitudinally along a first side and a second side of power pack 10 and laterally along a portion of a bottom of power pack 10. Bumper 110 defines a pair of apertures, shown as cutouts 118, that extends through a portion of ridge 114 and ridge 116, according to an exemplary embodiment. Cutouts 118 may facilitate the removal of connectors by an operator from second connector assembly 60 and third connector assembly 70.

According to an exemplary embodiment, first connector assembly 50, second connector assembly 60, and third connector assembly 70 are coupled to battery 90. First connector assembly 50, second connector assembly 60, and third connector assembly 70 may define dedicated inputs, dedicated outputs, a combination of dedicated inputs and dedicated outputs, or at least one switchable port (e.g., a port that may be an input or an output, etc.). In one embodiment, first connector assembly 50 defines an input for charging battery 90 while second connector assembly 60 and third connector assembly 70 define outputs for utilizing electrical power stored in battery 90. In another embodiment, first connector assembly 50 and second connector assembly 60 define outputs for utilizing electrical power stored in battery 90, and third connector assembly 70 defines an input for charging battery 90. In still another embodiment, first connector assembly 50, second connector assembly 60, and third connector assembly 70 define still another combination of inputs for charging battery 90 and/or outputs for utilizing electrical power stored in battery 90.

Figure 2:
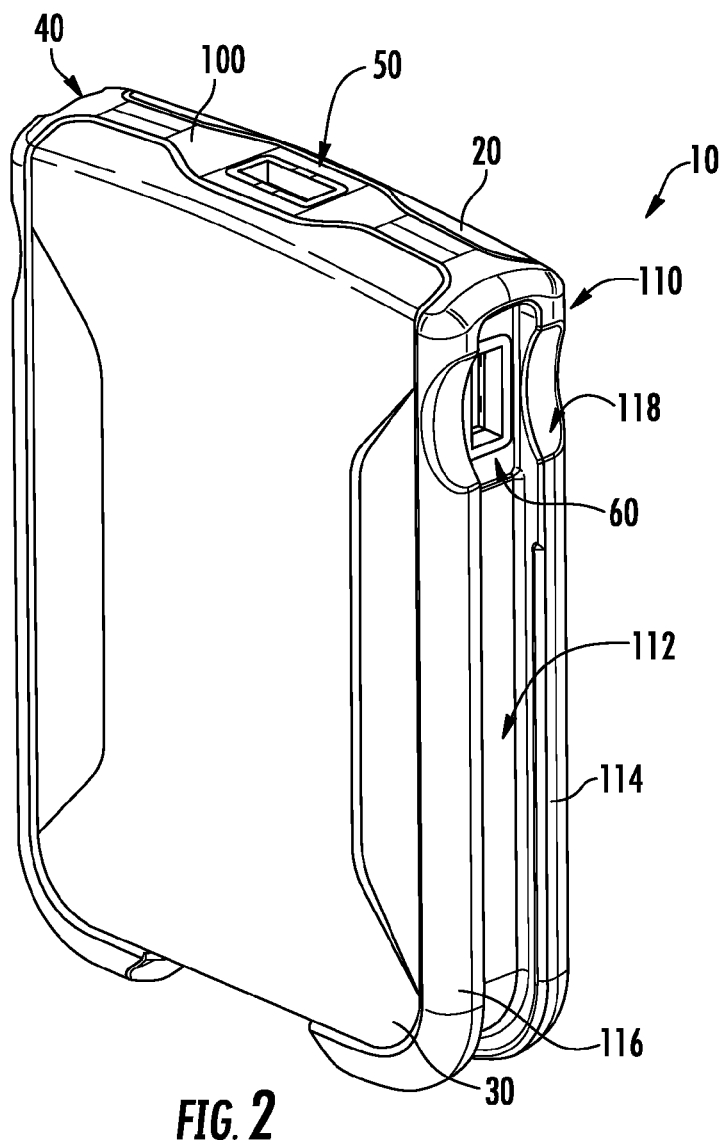
FIG. 2 is a rear perspective view of the portable energy storage and power supply system shown in FIG. 1, according to an exemplary embodiment.
Figure 3:
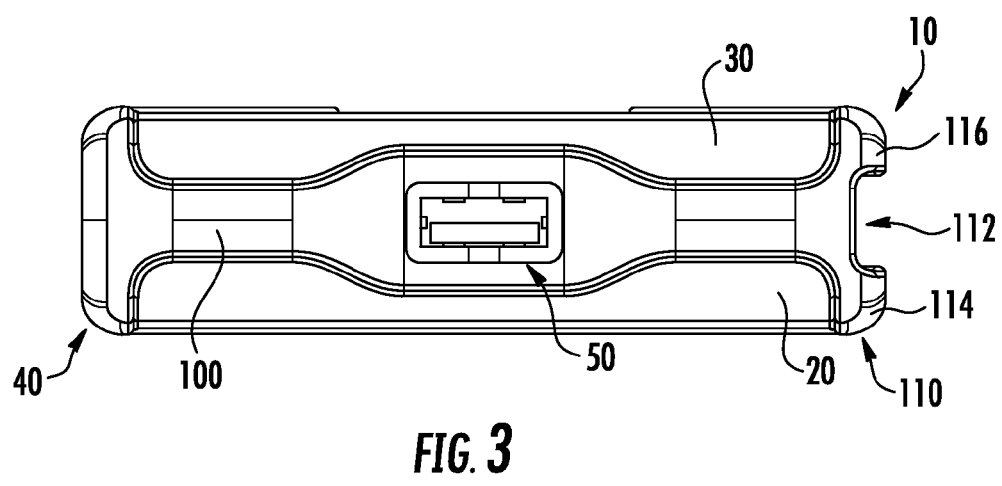
FIG. 3 is a top plan view of the portable energy storage and power supply system shown in FIG. 1, according to an exemplary embodiment.

According to the exemplary embodiment shown in FIGS. 1-2, first connector assembly 50 and second connector assembly 60 include female USB connectors. Third connector assembly 70 includes a female micro USB connector, according to an exemplary embodiment. An operator may couple a power source to at least one of first connector assembly 50, second connector assembly 60, and third connector assembly 70 to charge battery 90. By way of example, an operator may couple a power cable that includes a male USB connector with first connector assembly 50 or second connector assembly 60, or an operator may couple a power cable that includes a male micro USB connector with third connector assembly 70. The power cable may transmit electrical power from the power source to power pack 10. In one embodiment, the power source includes at least one of a solar panel assembly (e.g., a single solar panel, a plurality of solar panels daisy chained or otherwise coupled together, etc.), a generator, a wall outlet, and a computer. In other embodiments, the power source includes still another device. Such power sources may provide electrical power at a constant voltage or at variable voltages, according to various alternative embodiments.

In one embodiment, power pack 10 includes a processing circuit configured to evaluate whether at least one of first connector assembly 50, second connector assembly 60, and third connector assembly 70 is coupled to a power source. Upon detecting that at least one of first connector assembly 50, second connector assembly 60, and third connector assembly 70 is coupled to the power source, the processing circuit may begin charging battery 90 (e.g., begin directing electrical current to battery 90, etc.) automatically. In other embodiments, the processing circuit is configured to evaluate a characteristic of the electrical power provided by the power source (e.g., an input voltage, an input current, etc.). The processing circuit may be configured to charge battery 90 based on a determination that the characteristic exceeds a threshold value (e.g., an input voltage of five volts, an input current of more than between 1 and 2.5 watts, an input current of more than five watts, etc.).

The processing circuit may be configured to utilize a power path management strategy when power pack 10 is coupled to both a power source and an electronic device. By way of example, the processing circuit may determine whether a charge level of the electronic device is below a threshold value (e.g., a ninety five percent charge, etc.). When the charge level is below the threshold value, the processing circuit may be configured to direct incoming electrical power to at least one of power the electronic device and charge a battery of the electronic device. When the charge level is above the threshold value (e.g., the electronic device is already charged, etc.), the processing circuit may be configured to charge battery 90.

Figure 8:
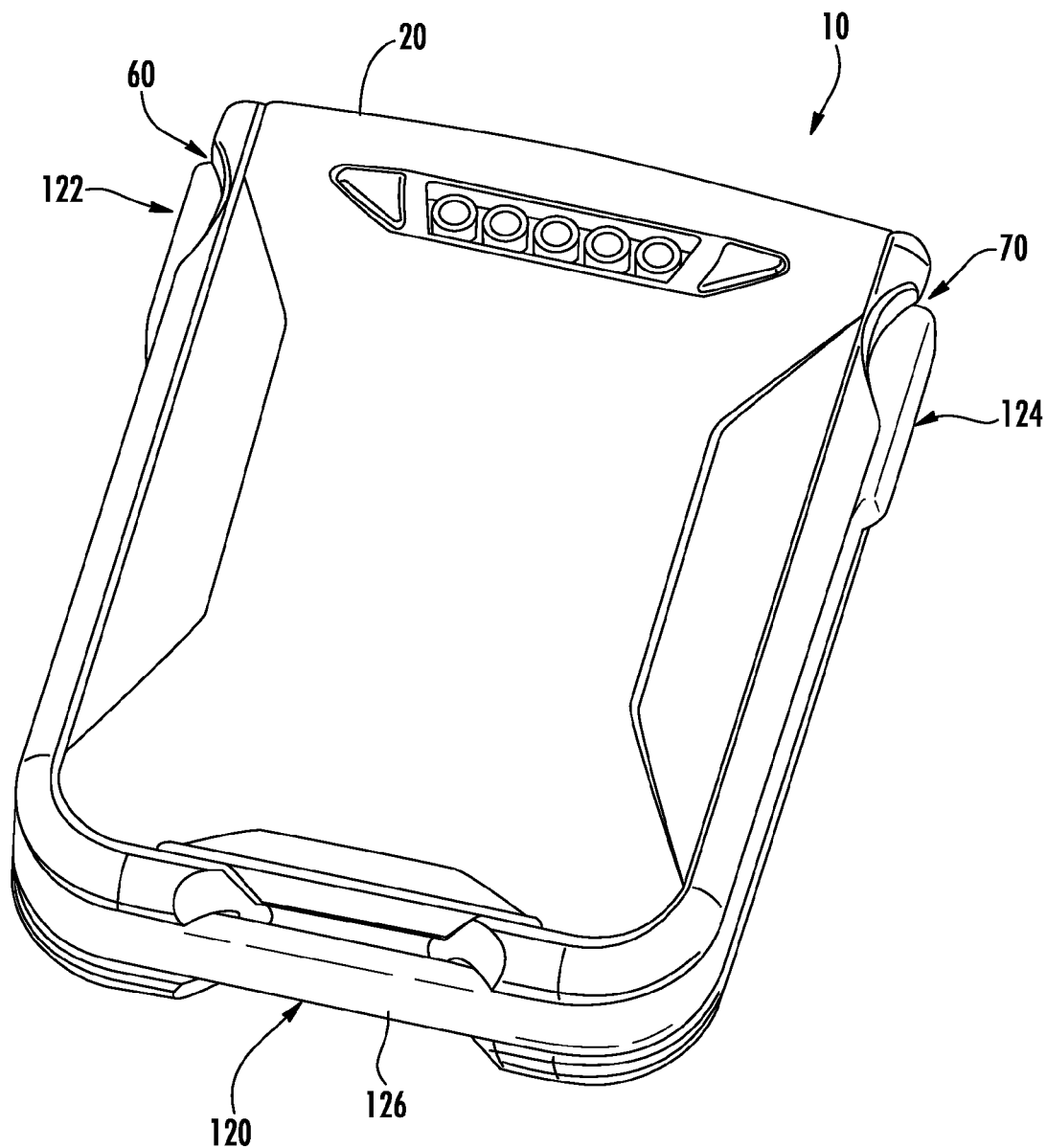
FIG. 8 is a front perspective view of a portable energy storage and power supply system including a power cable, according to an exemplary embodiment.
Figure 9:
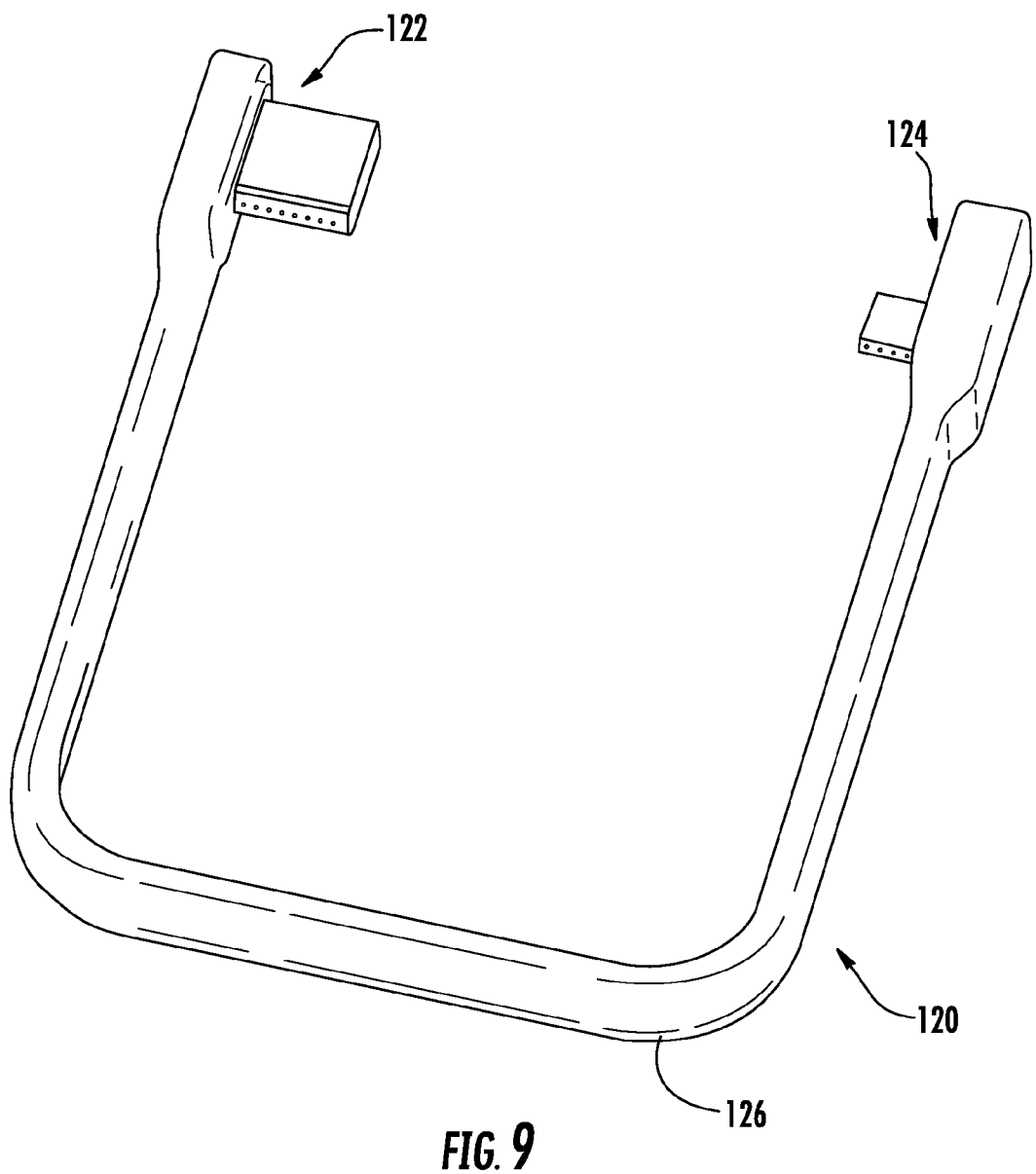
FIG. 9 is a front perspective view of a power cable for a portable energy storage and power supply system, according to an exemplary embodiment.

As shown in FIGS. 8-9, power pack 10 includes a power cable, shown as USB cable 120. According to an exemplary embodiment, an operator may selectively couple USB cable 120 to at least one of second connector assembly 60 and third connector assembly 70 to utilize electrical power stored in battery 90 or charge battery 90. As shown in FIGS. 8-9, USB cable 120 includes a proximal end 122 coupled to a distal end 124 by a length of cable 126. In one embodiment, a male USB connector is coupled to proximal end 122 of USB cable 120 such that USB cable 120 may be selectively coupled to second connector assembly 60. As shown in FIG. 9, a male micro USB connector is coupled to distal end 124 of USB cable 120 such that USB cable 120 may be selectively coupled to third connector assembly 70.

In one embodiment, USB cable 120 may be positioned for later use in a storage orientation, as shown in FIG. 8. In the storage orientation shown in FIG. 8, the male USB connector at proximal end 122 is coupled to second connector assembly 60, the male micro USB connector at distal end 124 is coupled to third connector assembly 70, and length of cable 126 is received within channel 112 defined by bumper 110. In one embodiment, USB cable 120 has a shape that corresponds to a shape of channel 112. By way of example, length of cable 126 may have at least one of a width and a thickness that engages sidewalls of channel 112 to facilitate retaining USB cable 120 therein. According to an alternative embodiment, USB cable 120 is otherwise positioned in a storage orientation.

From the storage orientation, an operator may remove the male USB connector at proximal end 122 of USB cable 120 from second connector assembly 60 and disengage (e.g., unwind, etc.) USB cable 120 from channel 112. The male micro USB connector at distal end 124 of USB cable 120 may remain connected to third connector assembly 70. An operator may thereafter plug the male USB connector at proximal end 122 of USB cable 120 into a device to be powered by power pack 10 or a source of electrical power. In one embodiment, an operator may charge battery 90 by coupling the male USB connector at proximal end 122 of USB cable 120 with a female USB port of a power source (e.g., a female USB port of a computer, etc.). Electrical power may flow from the power source, through USB cable 120, and into power pack 10 though third connector assembly 70.

An operator may alternatively remove the male micro USB connector at distal end 124 of USB cable 120 from third connector assembly 70 and disengage USB cable 120 from channel 112. The male USB connector at proximal end 122 of USB cable 120 may remain connected to second connector assembly 60. An operator may thereafter plug the male micro USB connector at distal end 124 of USB cable 120 into a device to be powered by power pack 10 or a source of electrical power. In one embodiment, an operator may at least one of power and charge an electrical device (e.g., a cellular telephone, a camera, etc.) having a female micro USB port by coupling the electronic device with power pack 10 using USB cable 120.

According to an exemplary embodiment, a processing circuit is configured to evaluate whether a power cable (e.g., USB cable 120, etc.) is coupled to two of the connector assemblies of power pack 10. In one embodiment, such an evaluation reduces the risk of self-discharge. By way of example, the processing circuit may evaluate whether proximal end 122 of USB cable 120 is coupled to second connector assembly 60 and distal end 124 of USB cable 120 is coupled to third connector assembly 70. In one embodiment, second connector assembly 60 defines an output for electrical power from battery 90 while third connector assembly 70 defines an input for electrical power to charge battery 90. The processing circuit may evaluate one or more characteristics of an electrical energy flow (e.g., current flow direction, voltage, etc.) to determine whether a power cable is coupled to two of the connector assemblies. In one embodiment, the processing circuit disengages (e.g., interrupts, etc.) at least one of the circuits to limit or prevent current flow through the power cable based on a determination that a self-discharge may occur.

Referring to FIGS. 1 and 6, user interface 80 includes a plurality of user input devices, shown as buttons 82. Buttons 82 are coupled to various electronic components of power pack 10 (e.g., circuits, controllers, battery 90, etc.), according to an exemplary embodiment. An operator may engage buttons 82 to provide a user input (e.g., to engage one or more functionalities of power pack 10). As shown in FIGS. 1 and 6, user interface 80 includes a display, shown as indicator 84. Indicator 84 includes a plurality of LED assemblies (e.g., cones) that each include a LED 86 and a LED 88. In one embodiment, the LEDs 86 of the LED assemblies define a first set of LEDs and the LEDs 88 of the LED assemblies define a second set of LEDs. In one embodiment, LEDs 86 are configured to emit a first color of light (e.g., white, etc.), and LEDs 88 are configured to emit a second color of light (e.g., blue, etc.). As shown in FIGS. 1 and 6, indicator 84 includes five LED assemblies. In other embodiments, indicator 84 includes more or fewer LED assemblies. According to an exemplary embodiment, each LED assembly includes a cover (e.g., lens, diffuser, etc.), and indicator 84 is protected by a lens.

According to an exemplary embodiment, indicator 84 is configured to provide information that varies based on the user input. By way of example, the plurality of LED assemblies may be configured to provide information that varies based on the user input. In one embodiment, indicator 84 provides different information by selectively illuminating LEDs 86 (e.g., one or more of the first set of LEDs, etc.) when an operator engages a first button 82 and selectively illuminating LEDs 88 (e.g., one or more of the second set of LEDs, etc.) when an operator engages a second button 82. In one embodiment, at least one of LEDs 86 and LEDs 88 may be illuminated to indicate a charge level of battery 90 (e.g., when an operator presses a first button 82, etc.). By way of example, one LED 86 may be illuminated to indicate a charge level of between zero and twenty percent, two LEDs 86 may be illuminated to indicate a charge level of between twenty and forty percent, three LEDs 86 may be illuminated to indicate a charge level of between forty and sixty percent, four LEDs 86 may be illuminated to indicate a charge level of between sixty and eighty percent, and five LEDs 86 may be illuminated to indicate a charge level of between eighty and one hundred percent. The other of LEDs 86 and LEDs 88 may be illuminated to indicate still other information. By way of example, the other of LEDs 86 and LEDs 88 may be illuminated (e.g., sequentially, in a specified pattern, etc.) to indicate a voltage of an input power source, a current level of an input power source, that a power source is coupled to power pack 10, or still another characteristic associated with power pack 10 (e.g., when an operator presses a second button 82, automatically, etc.). Accordingly, power pack 10 may provide additional information to an operator relative to power packs that include traditional display systems.

Figure 10:
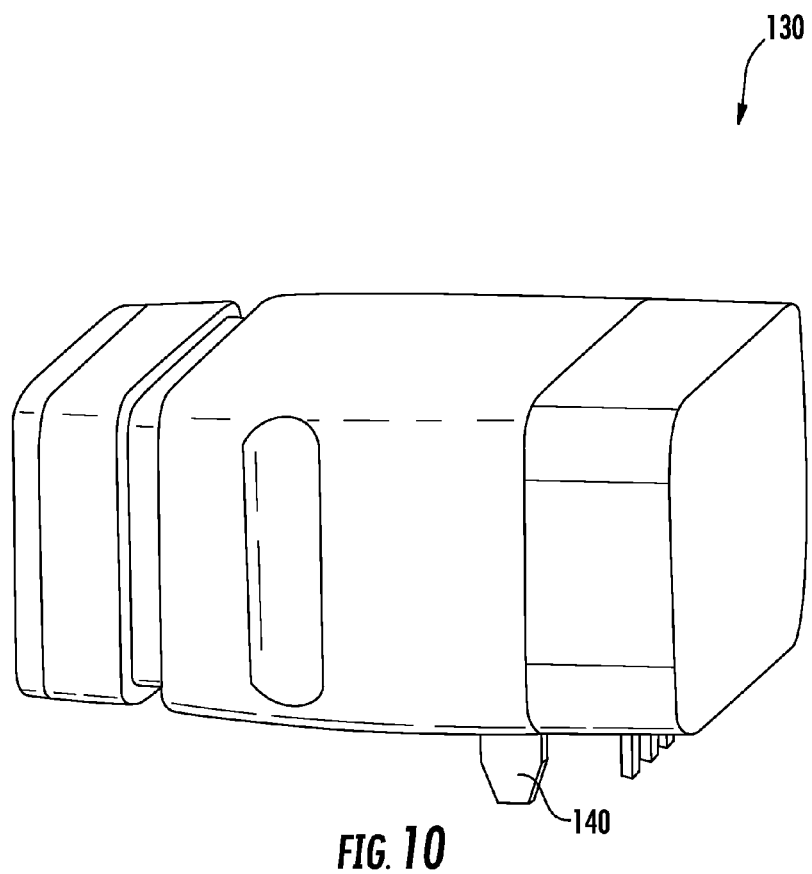
FIG. 10 is a front perspective view of a connector assembly, according to an exemplary embodiment.
Figure 11:
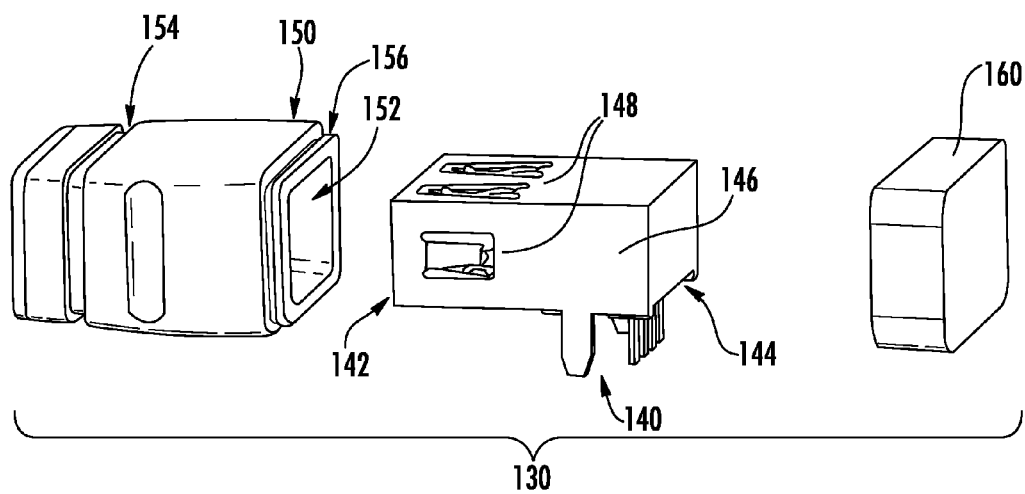
FIG. 11 is an exploded view of the connector assembly shown in in FIG. 10, according to an exemplary embodiment.

Referring next to FIGS. 10-11, a connector assembly, shown as connector assembly 130, is configured to reduce the risk of moisture penetration therethrough. According to an exemplary embodiment, at least one of first connector assembly 50, second connector assembly 60, and third connector assembly 70 may include the various components of connector assembly 130. By way of example, at least one of first connector assembly 50, second connector assembly 60, and third connector assembly 70 may be configured to reduce moisture penetration into the internal space defined by first housing member 20 and second housing member 30. As shown in FIG. 11, connector assembly 130 includes a shield, shown as shield 140. Shield 140 has an open end 142 and a closed end 144 defined by a sidewall 146, according to an exemplary embodiment. Sidewall 146 include a plurality of engagement features 148 that define a plurality of apertures and a plurality of tabs. In one embodiment, the plurality of engagement features 148 are used to secure a male connector end (e.g., a male USB connector end, a male micro USB connector end, etc.) within shield 140. A plurality of contacts may be disposed within shield 140 and used to couple various electronic devices (e.g., a portable electronic device with a portable energy storage and power supply system, etc.).

Referring still to FIGS. 10-11, connector assembly 130 includes a grommet, shown as grommet 150. Grommet 150 is configured to be disposed around an outer surface of shield 140, according to an exemplary embodiment. Grommet 150 substantially seals apertures defined within sidewall 146 of shield 140, according to an exemplary embodiment. By way of example, grommet 150 may substantially seal apertures defined at least in part by engagement features 148. Grommet 150 reduces the risk of moisture penetration into a structure within which connector assembly 130 is mounted, according to an exemplary embodiment. Accordingly, grommet 150 may seal an electrical connector (e.g., a USB connector, a micro USB connector, etc.) without the use of a cover disposed over open end 142 of shield 140. A user may selectively engage and disengage an electrical connector end into and out of shield 140 without needing to remove or reposition a cover.

As shown in FIG. 11, grommet 150 defines an opening 152 configured to receive shield 140. By way of example, an outer surface of shield 140 may engage (e.g., contact, etc.) an inner surface of grommet 150. According to an exemplary embodiment, grommet 150 is formed from a resilient material (e.g., silicone, urethane, rubber, etc.) such that grommet 150 may stretch and hold shield 140. According to an alternative embodiment, grommet 150 is overmolded around shield 140. As shown in FIG. 11, grommet 150 includes a first slot 154 that is configured to engage a surface (e.g., a periphery, etc.) of a structure (e.g., housing, case, gasket, etc.) within which connector assembly 130 is positioned. By way of example, a grommet of at least one of first connector assembly 50, second connector assembly 60, and third connector assembly 70 may be configured to engage a surface of first housing member 20, second housing member 30, and/or gasket 40. As shown in FIG. 1, a grommet of first connector assembly 50, second connector assembly 60, and third connector assembly 70 is configured to engage a surface of gasket 40 to reduce the risk of moisture penetration into power pack 10 (e.g., into the internal space defined by first housing member 20 and second housing member 30). By way of example, openings 46 defined by peripheries of gasket 40 may receive a portion of first connector assembly 50, second connector assembly 60, and third connector assembly 70 (e.g., openings 46 may engage grommets of the connector assemblies, etc.).

According to the exemplary embodiment shown in FIG. 11, grommet 150 includes a second slot 156 that is configured to engage a cap 160. As shown in FIGS. 11-12, cap 160 is disposed over closed end 144 of shield 140 and interlocks second slot 156 of grommet 150. In other embodiments, cap 160 is otherwise coupled to at least one of shield 140 and grommet 150. Grommet 150 and cap 160 reduce the risk of moisture penetration into a structure within which connector assembly 130 is mounted, according to an exemplary embodiment. Accordingly, grommet 150 and cap 160 may seal an electrical connector (e.g., a USB connector, a micro USB connector, etc.) without the use of a cover disposed over open end 142 of shield 140. A user may selectively engage and disengage an electrical connector end into and out of shield 140 without needing to remove or reposition a cover. In one embodiment, power pack 10 including connector assemblies 130 is sealed from the inside to prevent water from seeping into an internal volume thereof. Such a power pack 10 may be waterproof without use of an external cover disposed over connector assembly 130.

In one embodiment, a method of sealing a port includes providing a connector including a shield (e.g., shield 140, etc.) that defines a plurality of apertures (e.g., apertures defined by engagement features 148, etc.). The method includes disposing a grommet (e.g., grommet 150, etc.) around an outer surface of the shield and over the plurality of apertures. The method further includes providing a housing including a periphery that defines an opening and inserting the grommet and the connector into the opening. According to an exemplary embodiment, the method further includes positioning a cap (e.g., cap 160, etc.) over a first end of the connector that is configured to be disposed within an inner volume of the housing. The grommet may include a slot (e.g., first slot 154, etc.) configured to receive the periphery of the housing. In one embodiment, the method include overmolding the grommet around the connector.

The construction and arrangement of the systems as shown in the various exemplary embodiments are illustrative only. Although only a few embodiments have been described in detail, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A portable energy storage and power supply system, comprising:
   a first housing member coupled to a second housing member, wherein the first housing member and the second housing member define an internal space;
   a battery disposed within the internal space and configured to store electrical power;
   a plurality of connectors including:
      a first connector that defines an output for utilizing electrical power from the battery;
      a second connector that defines an output for utilizing electrical power from the battery; and
      a third connector that defines an input for charging the battery;
   a gasket including a base portion coupling the first housing member with the second housing member and a bumper shaped to absorb shock loading, wherein the gasket defines a channel configured to receive a length of a power cable; and
   the power cable selectively positioned within the channel, the power cable including a proximal end coupled to the second connector and a distal end coupled to the third connector.

2. The system of claim 1, wherein the base portion of the gasket extends between a surface of the first housing member and a surface of the second housing member.

3. The system of claim 2, wherein the gasket substantially seals the internal space.

4. The system of claim 1, wherein at least one of the first housing member and the second housing member define an outer edge, and wherein the bumper extends outward relative to the outer edge.

5. The system of claim 4, wherein the first housing member and the second housing member define a central axis, and wherein the bumper extends further from the central axis than the outer edge.

6. The system of claim 1, wherein the first housing member includes a first plate and the second housing member includes a second plate, and wherein the bumper includes a first projection positioned on a first side of the channel to protect the first plate and a second projection positioned on a second side of the channel to protect the second plate.

7. The system of claim 1, further comprising a processing circuit configured to prevent self-discharge from the battery based on a determination that the proximal end is coupled to the second connector and the distal end is coupled to the third connector.

8. The system of claim 1, further comprising a user interface including a plurality of LED assemblies and a pair of user input devices for receiving a user input.

9. The system of claim 8, wherein the plurality of LED assemblies each include a first LED and a second LED, and wherein the plurality of LED assemblies are configured to provide information that varies based on the user input.

* * * * *